(12) United States Patent
Oh et al.

(10) Patent No.: US 7,120,341 B2
(45) Date of Patent: Oct. 10, 2006

(54) OPTICAL FIBER FOR LONG-DISTANCE OPTICAL COMMUNICATION NETWORK

(75) Inventors: Sung-Koog Oh, Gumi-si (KR); Ju-Chang Han, Gumi-si (KR); Yun-Geun Jang, Gumi-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 10/963,939

(22) Filed: Oct. 13, 2004

(65) Prior Publication Data

US 2005/0254766 A1   Nov. 17, 2005

(30) Foreign Application Priority Data

May 13, 2004   (KR)   ................... 10-2004-0033748

(51) Int. Cl.
*G02B 6/02*   (2006.01)
(52) U.S. Cl. ........................... 385/123; 385/127
(58) Field of Classification Search ............... 385/127, 385/123, 124, 126
See application file for complete search history.

(56) References Cited

U.S. PATENT DOCUMENTS

| 5,483,612 | A | | 1/1996 | Gallagher et al. | ........... 385/127 |
|---|---|---|---|---|---|
| 5,559,921 | A | * | 9/1996 | Terasawa et al. | ........... 385/124 |
| 5,732,178 | A | * | 3/1998 | Terasawa et al. | ........... 385/127 |
| 5,781,684 | A | * | 7/1998 | Liu | ............... 385/124 |
| 5,835,655 | A | * | 11/1998 | Liu et al. | ............... 385/124 |
| 5,913,005 | A | * | 6/1999 | Terasawa et al. | ........... 385/124 |
| 6,091,873 | A | * | 7/2000 | Matsuo et al. | ............. 385/123 |
| 6,335,995 | B1 | | 1/2002 | Kato et al. | ................ 385/123 |
| 6,421,489 | B1 | * | 7/2002 | Berkey et al. | ............. 385/123 |
| 6,424,778 | B1 | * | 7/2002 | Li | ............... 385/127 |
| 6,959,135 | B1 | * | 10/2005 | Bickham et al. | ........... 385/123 |
| 2005/0175303 | A1 | * | 8/2005 | Jang et al. | ................ 385/124 |

FOREIGN PATENT DOCUMENTS

| EP | 0689068 | 12/1995 |
|---|---|---|
| EP | 1158323 | 11/2001 |

* cited by examiner

*Primary Examiner*—Rodney Bovernick
*Assistant Examiner*—Mike Stahl
(74) *Attorney, Agent, or Firm*—Cha & Reiter, L.L.C.

(57) ABSTRACT

An optical fiber for long-distance optical communication networks has a zero dispersion wavelength value in the range of 1560 to 1570 nm and a dispersion gradient value, at a wavelength band of 1550 nm, in the range of 0.055 to 0.075 ps/nm$^2$/km.

8 Claims, 6 Drawing Sheets

OPTICAL FIBER FOR LONG-DISTANCE OPTICAL COMMUNICATION NETWORK

CLAIM OF PRIORITY

This application claims priority to an application entitled "optical fiber for long-distance optical communication network," filed with the Korean Intellectual Property Office on May 13, 2004 and assigned Serial No. 2004-33748, the contents of which are hereby incorporated by reference.

BACKGROUND OF THE INVENTION

1. Field of the Invention

The present invention relates to an optical fiber and, more particularly, to an optical fiber applicable in long-distance optical communication networks.

2. Description of the Related Art

In an effort to cope with an ever-increasing demand for higher capacity and speed, optical communication systems—namely, a WDM (wavelength division multiplex) technique that can perform a large-capacity transmission at high speed—are being deployed. The WDM systems may be classified into DWDM (dense wavelength division multiplex) systems and CWDM (coarse wavelength division multiplex) systems.

The optical communication networks utilizing the WDM mode are classified into access networks, metro-access networks, metro-core networks, long-haul networks, and ultra long-haul networks depending on the transmission distance. The access networks represent short-distance optical communication networks, while the metro and long-haul networks are long-distance optical communication networks. Specifically, the access networks are used for a distance range of 1–5 km; the metro-access networks for 20–100 km; the metro-core networks for 100–300 km; the long-haul networks for 300–1000 km; and the ultra long-haul networks for 1000 km or more.

Optical fibers used in long-distance optical communication networks in the range of hundreds of kilometers, such as metro and long-haul networks, include a core having a high refractive index, a clad having a low refractive index, and an optional ring region positioned between the core and the clad with a lower refractive index than that of the core. For economic reasons, the conventional long-distance optical communication networks use optical fibers having a dispersion value of −7 to −8 ps/nm/km at a wavelength of 1550 nm.

However, the optical fibers having a dispersion value of −7 to −8 ps/nm/km at a wavelength of 1550 nm tend to experience a degraded transmission efficiency due to dispersion at a transmission rate of 2.5 Gbps. Furthermore, they are not suitable for use in metro networks, which have a transmission distance of 100 km or more and a transmission rate of 10 Gbps, due to this excessively negative dispersion value.

In an effort to solve the above problem, it is proposed to use optical fibers having a large dispersion gradient in the long-distance optical communication networks with a transmission distance of 100 km or more. However, this proposal has a problem in that, although the dispersion characteristics are suitable for metro networks for 200 km or less, it has a limited transmission distance due to a dispersion phenomenon in the case of long-haul networks for long-distance transmission of 200 km or more. Moreover, a nonlinear phenomenon, such as FWM (four-wave mixing), occurs when the optical fibers have a small dispersion-gradient value at a wavelength of 1550 nm, and have a limited transmission distance due to an increased dispersion, which occurs when the dispersion gradient value is large.

SUMMARY OF THE INVENTION

Accordingly, the present invention has been made to solve the above-mentioned problems occurring in the prior art and provides additional advantages, by providing an optical fiber used in long-distance optical communication networks for high-speed communication, such as metro networks and long-haul networks.

One aspect of the present invention is to provide an optical fiber capable of using a wavelength band of both the C-band and the L-band.

Another aspect of the present invention is to provide an optical fiber used in long-distance optical communication networks having a zero-dispersion wavelength value in the range of 1560 to 1570 nm and a dispersion gradient value, at a wavelength band of 1550 nm, in the range of 0.055 to 0.075 ps/nm$^2$/km.

BRIEF DESCRIPTION OF THE DRAWINGS

The above features and advantages of the present invention will be more apparent from the following detailed description taken in conjunction with the accompanying drawings, in which:

FIG. 1b shows the refractive index profile of the optical fiber shown in FIG. 1a;

FIG. 2 shows the relationship between the dispersion value and the optical signal transmission distance of the optical signal shown in FIG. 1a;

FIG. 4 shows the relationship between the dispersion gradient and a wavelength band of the optical fiber shown in FIG. 1a;

DETAILED DESCRIPTION

Hereinafter, embodiments of the present invention will be described with reference to the accompanying drawings. For the purposes of clarity and simplicity, a detailed description of known functions and configurations incorporated herein will be omitted as it may make the subject matter of the present invention unclear.

Figure 1A:
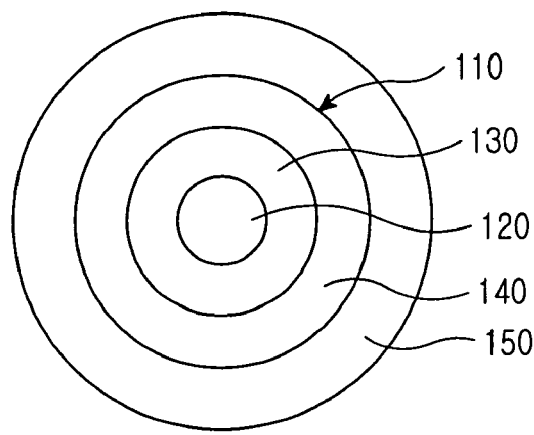
FIG. 1a shows the construction of an optical fiber for long-distance communication networks according to an embodiment of the present invention.

Referring to FIG 1a, an optical fiber 100 utilized in both metro networks and long-haul networks includes a core 110 and a clad 150. The core 110 is defined by a first region 120, a second region 130, and a third region 140.

The first region 120 has a radius R1 about the center of the optical fiber 100 and a refractive index N1, which is the maximum refractive index of the optical fiber 100.

The second region 130 surrounds the first region 120. The inner periphery of the depressed region 130 corresponds to the outer periphery of the first region 120. The outer periphery of the second region 130 has a radius R2 about the center of the optical fiber 100. The second region 130 has a refractive index N2, which is the minimum refractive index of the optical fiber 100.

The third region 140 surrounds the second region 130. The inner periphery of the third region 140 corresponds to the outer periphery of the second region 130. The outer periphery of the third region 140 has a radius R3 about the center of the optical fiber 100. The third region 140 has a refractive index N3, which is larger than N2 but smaller than N1.

The clad 150 surrounds the third region 140. The inner periphery of the clad 150 corresponds to the outer periphery of the third region 140. The outer periphery of the clad 150 has a radius R4 about the center of the optical fiber 100. The clad 150 has a refractive index N4, which is larger than N2 but smaller than N3.

Figure 1B:
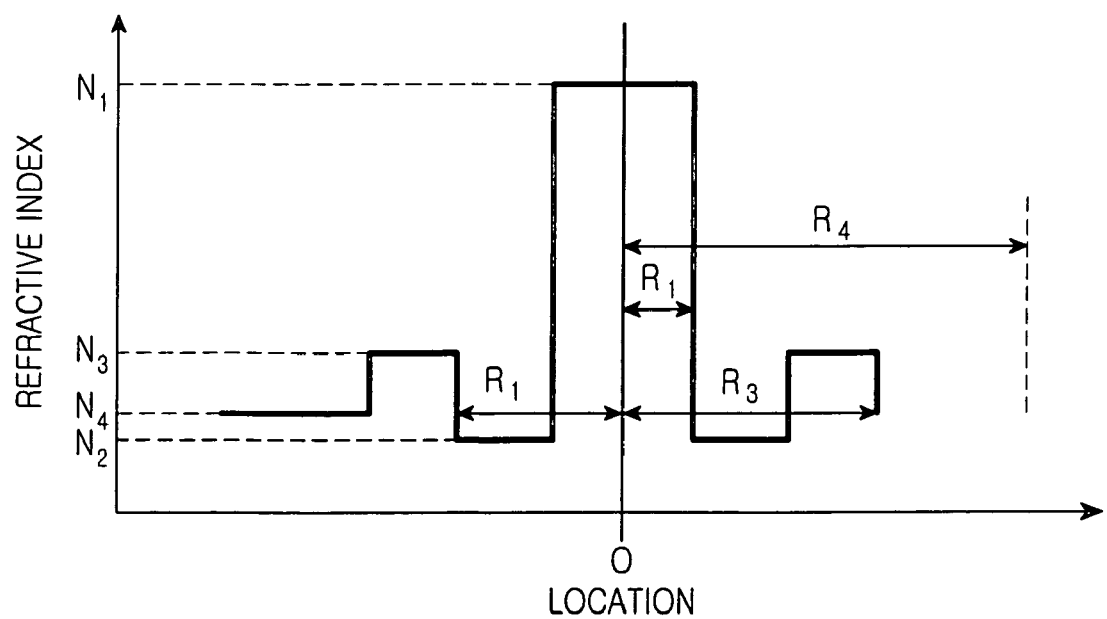

FIG. 1b illustrates the refractive-index profile of the optical fiber shown in FIG. 1a.

Figure 2:
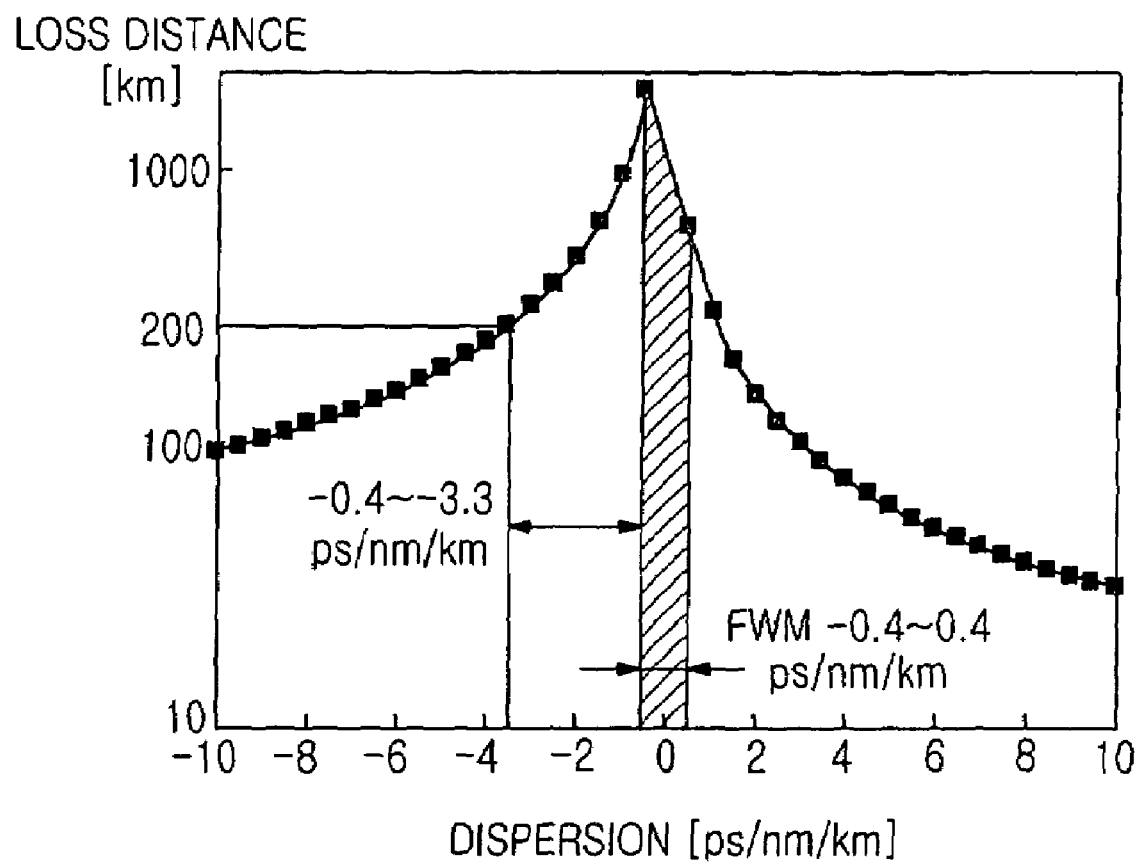
Figure 3:
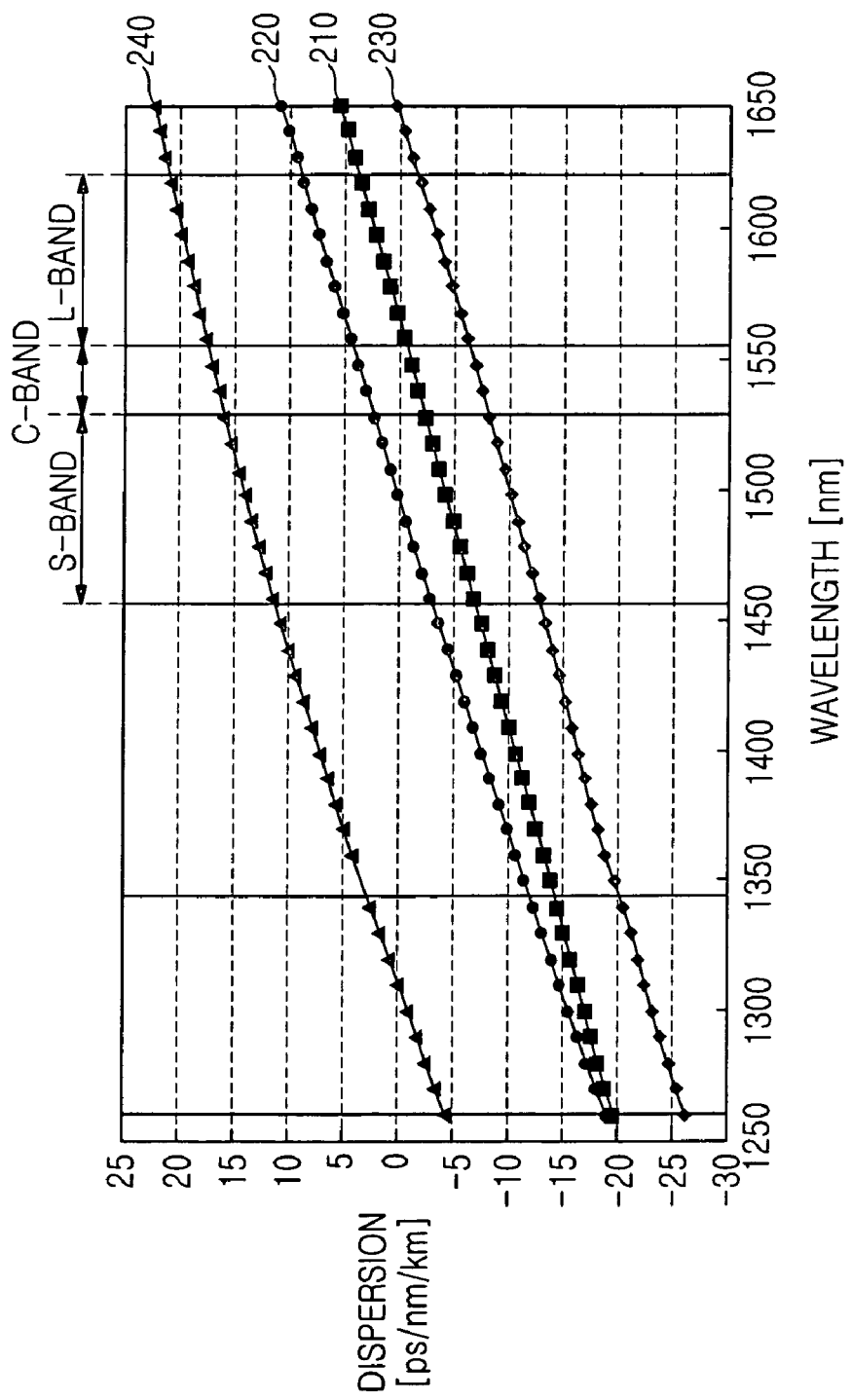
FIG. 3 shows the comparison of dispersion characteristics according to a wavelength between the optical shown in FIG. 1a and conventional optical fibers.

FIG. 2 illustrates the relationship between the dispersion value and the optical signal transmission distance of optical signals as applied to the fiber of FIG. 1a, and FIG. 3 illustrates the comparison of dispersion characteristics according to the wavelength between the optical signals as applied to the fiber of FIG. 1a and conventional optical fibers.

Now, the characteristics of an inventive optical fiber for long-distance optical communication networks shown in FIG. 1 will be described with reference to FIGS. 2 and 3.

The loss region due to FWM (four-wave mixing) shown in FIG. 2 is a nonlinear phenomenon wherein different wavelengths of channels are mixed by crosstalk and create a new wavelength of a channel. This phenomenon tends to occur, in particular, when the dispersion value is in the range of −0.4 to 0.4 ps/nm/km. If the dispersion value is in the range of −0.4 to −10 ps/nm/km, as shown in FIG. 2, the optical fiber may be used in middle/short-distance optical communication networks having a transmission distance of 100 km. However, the optical fiber is not suitable for long-distance optical communication networks having a longer transmission distance, because the dispersion loss will increase. For use in long-distance optical communication networks, such as metro networks and long-haul networks, the optical fiber shown in FIG. 1, therefore, must have a negative dispersion value in the range of −0.4 to −3.3 ps/nm/km or a positive dispersion value in the range of 0.4 to 3 ps/nm/km.

Referring to FIG 3, there are shown a dispersion vs. wavelength curve 210 characteristic of the optical fiber shown in FIG 1a for a transmission distance of 200 km or more; a dispersion vs. wavelength curve 230 of an NZDSF (non-zero dispersion shifted fiber) having a typical negative dispersion value; a dispersion vs. wavelength curve 220 of an NZDSF having a typical positive dispersion value; and a dispersion vs. wavelength curve 240 of a conventional single-mode optical fiber used in CWDM (coarse wavelength division multiplex).

As shown in FIG 3, the dispersion curve 210 of present optical fiber has a negative dispersion value in the C-band and a positive dispersion value in the L-band. This is for the purpose of obtaining a maximum channel efficiency by causing the dead zone of a conventional erbium-added optical fiber amplifier to coincide with the zero dispersion location of the optical fiber shown in FIG 1a. The zero dispersion wavelength of the dispersion curve 210 of present optical fiber is preferably located in the wavelength range of 1560 to 1570 nm. The dispersion curve 210 has a negative dispersion value in the C-band, and thus a direct modulation mode can be applied. In addition, the dispersion curve 210 of present optical fiber has a positive dispersion value in the L-band, and thus an external modulation mode can be applied. As a result, long-distance optical communication networks can be established in an economical way using the structure shown in FIG 1a.

The dispersion curve 230 of the NZDSF with typical negative dispersion value has a negative dispersion value of maximum −10 ps/nm/km in the wavelength band of 1550 nm. Therefore, such dispersion curve 230 cannot be applied to an optical fiber for use in long-distance optical communication networks having a transmission distance of 200 km or more, due to this excessively negative dispersion value. The dispersion curve 220 of the NZDSF with typical positive dispersion value has large positive dispersion values in the wavelength band of the C-band and L-band, and thus cannot be applied to an optical fiber for use in long-distance optical communication networks. The dispersion curve 240 of the conventional single-mode optical fiber used in CWDM, which shows the characteristics of a single-mode optical fiber usable in the wavelength band of 1250 to 1450 nm, has a dispersion value of about 10 ps/nm/km or more in wavelength bands including at least the S-band, and thus cannot be applied easily to an optical fiber for use in long-distance optical communication networks.

Figure 5:
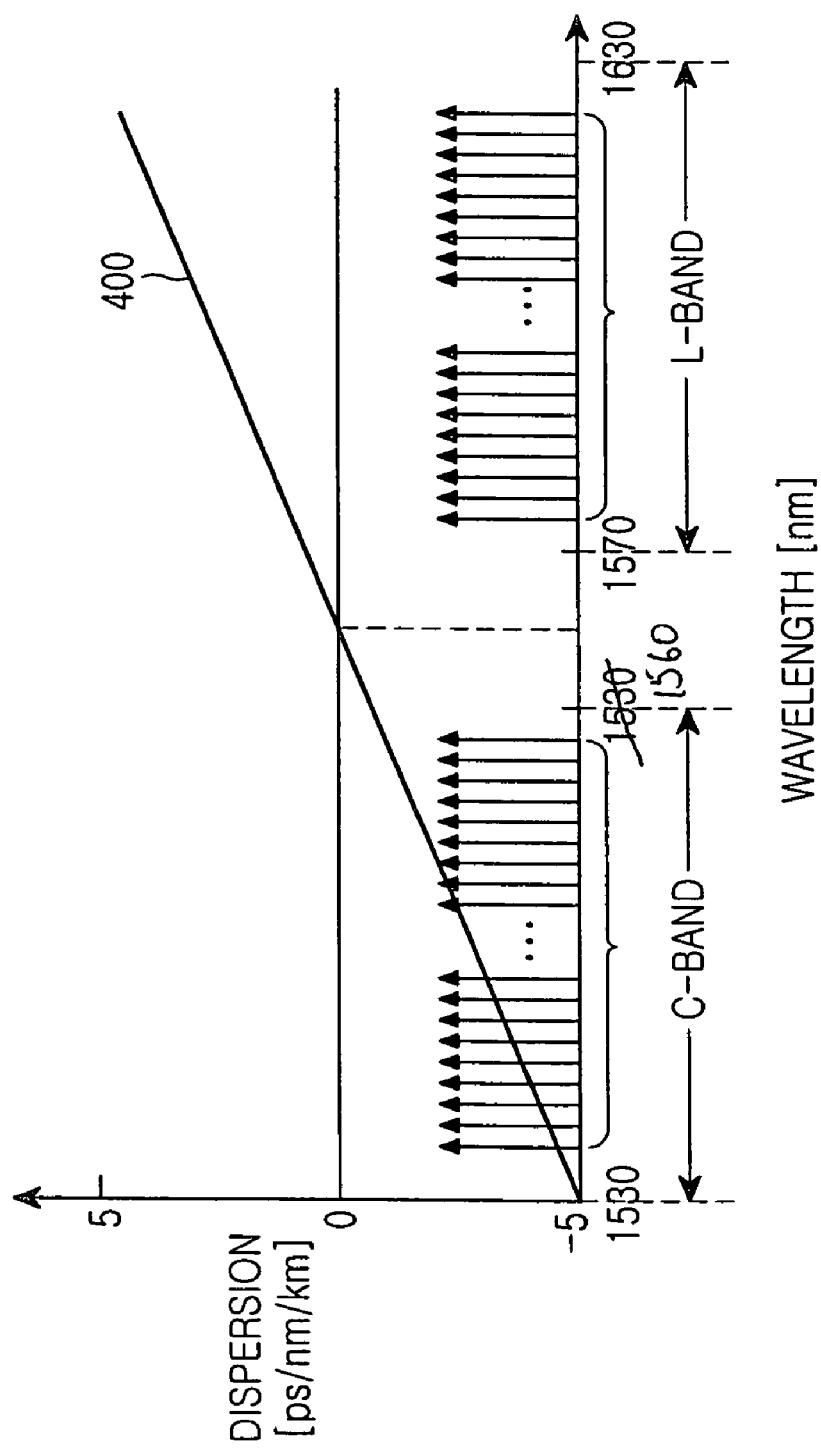
FIG. 5 shows the relationship between the first dispersion curve shown in FIG. 3 and usable wavelength bands.
Figure 6A:
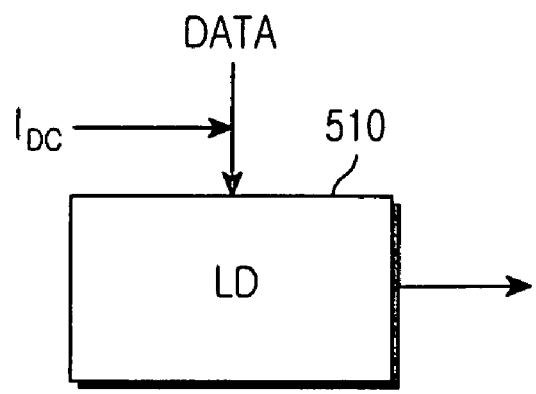
FIG. 6a illustrates a direct modulation mode.
Figure 6B:
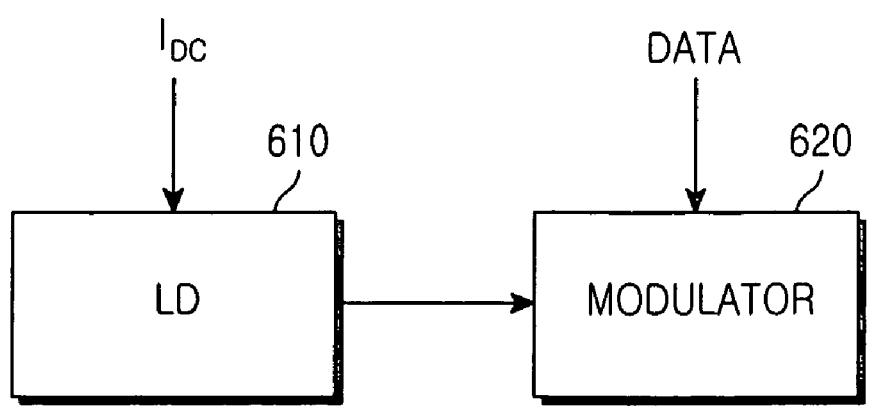
FIG. 6b illustrates an external modulation mode.

FIG. 5 illustrates the relationship between the first dispersion curve shown in FIG. 3 and usable wavelength bands. FIG. 6a shows a direct modulation mode, and FIG. 6b shows an external modulation mode. An example of using the optical fiber 100 shown in FIG. 1a according to the teachings of the present invention will be described now with reference to FIGS. 5, 6a, and 6b.

Referring to FIG. 6a, DC voltage $I_{DC}$ and data are applied to an LD (laser diode) 510 to modulate light outputted from the LD 510. Directly-modulated optical signals are known to exhibit positive chirp characteristics.

Referring to FIG. 6b, DC current is applied to an LD 610 to create light. The light is inputted to a modulator 620. The modulator 620 then modulates the light with inputted data.

Figure 4:
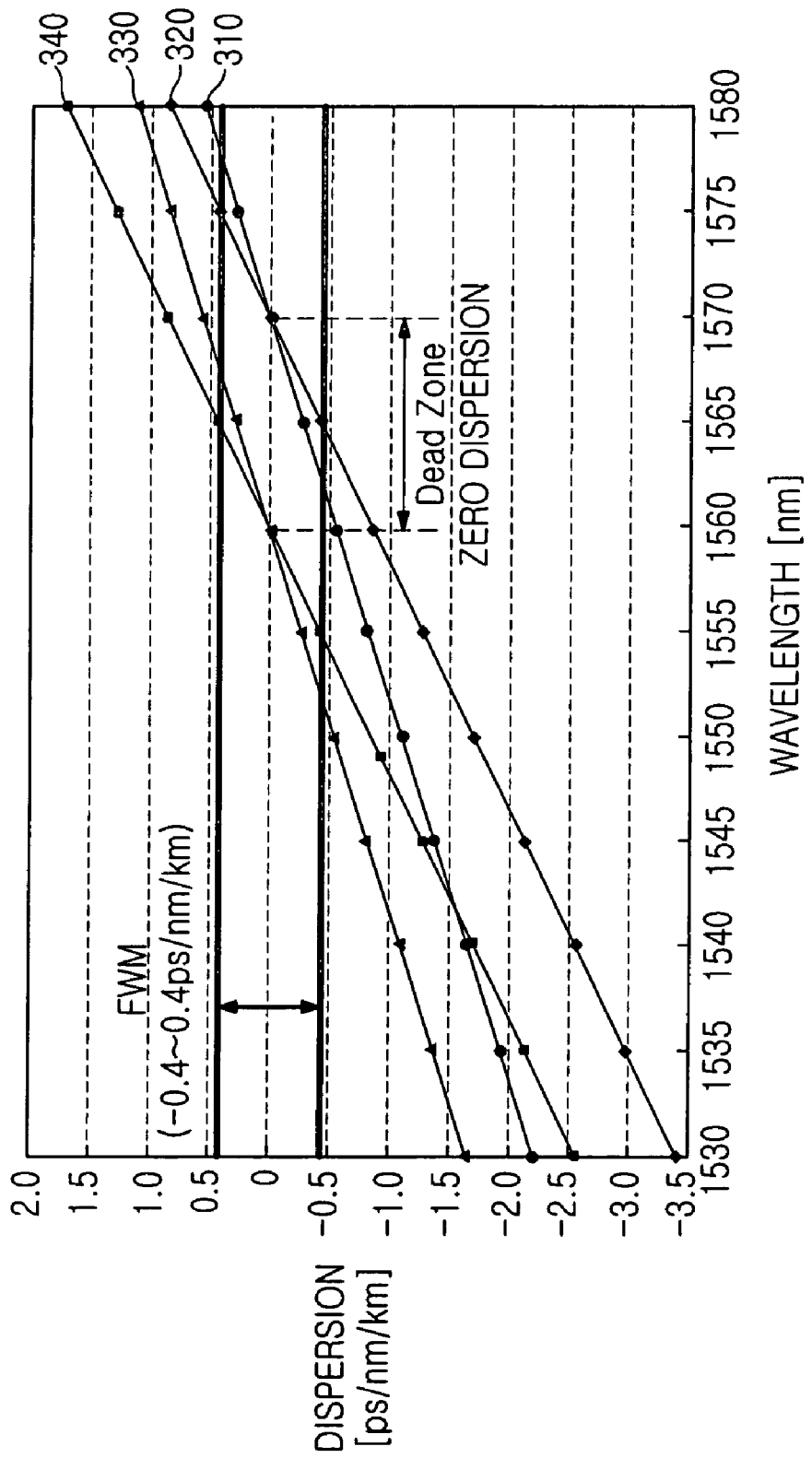

FIG. 4 shows the relationship between a dispersion gradient and a wavelength band of the optical fiber shown in FIG. 1a and, in particular, compares dispersion curves and the dispersion gradient value of which is varied within the zero dispersion wavelength range, i.e., 1560 to 1570 nm, of the optical fiber shown in FIG. 1a.

Referring to FIG. 4, the first dispersion curve 310 has a zero dispersion wavelength value of 1570 nm with a dispersion gradient value of 0.055 ps/nm²/km. The second dispersion curve 320 has a zero dispersion wavelength value of 1570 nm with a dispersion gradient value of 0.075 ps/nm²/km. The third dispersion curve 330 has a zero dispersion wavelength value of 1560 nm with a dispersion gradient value of 0.055 ps/nm²/km. The fourth dispersion curve 340 has a zero dispersion wavelength value of 1560 nm with a dispersion gradient value of 0.075 ps/nm²/km. For example, if the optical fiber 100 shown in FIG. 1a has a zero dispersion wavelength value of 1560 nm and a dispersion gradient value far above 0.075 ps/nm²/km, it may be used in metro networks of about 200 km, but it cannot be used for metro core networks or long haul networks of 200 km or more. Therefore, the optical fiber 100 must have a zero dispersion wavelength value in the range of 1560 to 1570 nm and a dispersion gradient value in the range of 0.055 to 0.075 ps/nm²/km, in order to use the wavelength band of both the C-band and the L-band.

Accordingly, the optical fiber 100 can exhibit optimal channel efficiency when it has a zero dispersion wavelength value of 1560 to 1570 nm and a dispersion gradient value of 0.055 to 0.075 ps/nm$^2$/km so that it has suitable dispersion values in the C-band and the L-band. Since the optical fiber 100 has a simple refractive index profile and a small second region, it can have an increased effective sectional area to accommodate more wavelength bands. When the effective sectional area is 55 μm$^2$ or more, the optical fiber exhibits an excellent transmission efficiency at 10 Gbps.

Although the optical fiber 100 has negative dispersion characteristics in the wavelength band of 1550 nm, preferably it can use the wavelength band of both the C-band and the L-band by adjusting the zero dispersion wavelength value to be in the range of 1560 to 1570 nm and the dispersion gradient value to be in the range of 0.055 to 0.075 ps/nm$^2$/km. In other words, the optical fiber can be used in long-distance optical communication networks by minimizing the wavelength band, which overlaps the dispersion value of FWM (four-wave mixing), as well as the dispersion value of the optical fiber itself.

As mentioned above, the optical fiber according to the present invention is advantageous because it is possible to use the wavelength band of both the C-band and the L-band, by causing the dead zone of the optical fiber amplifier to coincide with the zero dispersion location of the optical fiber. Also, it is possible to easily increase the number of usable channels and the communication capacity, and thus the optical fiber can be used for long-distance optical communication networks.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An optical fiber for long-distance optical communication networks comprising:

a core having a first region having a maximum refractive index at the center of the first region and a second region having a minimum refractive index and surrounding the periphery of the first region, and a clad having a predetermined refractive index higher than the minimum refractive index of the second region and surrounding the periphery of the core, said fiber having a zero dispersion wavelength value in the range of 1560 to 1570 nm and a dispersion gradient value, at a wavelength band of 1550 nm, in the range of 0.055 to 0.075 ps/nm$^2$/km.

2. The optical fiber as claimed in claim 1, wherein said optical fiber has a loss of 0.25 dB/km or less in the C-band and the L-band.

3. The optical fiber as claimed in claim 1, wherein said optical fiber has an effective sectional area of 55 μm$^2$ or more at a wavelength band of 1550 nm.

4. The optical fiber as claimed in claim 1, wherein said optical fiber has a negative dispersion value in the C-band and a positive dispersion value in the L-band.

5. The optical fiber as claimed in claim 1, wherein said optical fiber has a dispersion value of at least −3.3 ps/nm/km.

6. The optical fiber as claimed in claim 1, said core further comprising a third region surrounding the periphery of the second region.

7. The optical fiber as claimed in claim 6, wherein the refractive index of the first region is substantially greater than the refractive index of the third region.

8. The optical fiber as claimed in claim 6, wherein the refractive index of the second region is substantially less than the refractive index of the third region.

* * * * *